United States Patent [19]

Lis

[11] Patent Number: 5,245,538
[45] Date of Patent: Sep. 14, 1993

[54] PROCESS FOR REPRESENTING VIEWS OF AN OBJECT

[75] Inventor: Olivier Lis, Versailles, France

[73] Assignee: General Electric CGR S.A., Issy les Moulineaux, France

[21] Appl. No.: 425,192

[22] PCT Filed: Apr. 12, 1988

[86] PCT No.: PCT/FR88/00177
§ 371 Date: Oct. 17, 1989
§ 102(e) Date: Oct. 17, 1989

[87] PCT Pub. No.: WO88/08169
PCT Pub. Date: Oct. 20, 1988

[30] Foreign Application Priority Data
Apr. 17, 1987 [FR] France .................. 87 05487

[51] Int. Cl.⁵ .................. G06F 15/42; A61B 6/03
[52] U.S. Cl. .................. 364/413.13; 364/413.19; 364/413.15
[58] Field of Search .................. 395/121, 124, 126, 127; 364/413.13, 413.15, 413.17, 413.18, 413.19; 324/309

[56] References Cited

U.S. PATENT DOCUMENTS

| | | | |
|---|---|---|---|
| 4,729,098 | 3/1988 | Cline et al. | 369/413.18 |
| 4,737,921 | 4/1988 | Goldwasser et al. | 395/121 |
| 4,751,643 | 6/1988 | Lorensen et al. | 364/414 |
| 4,821,210 | 4/1989 | Rumbaugh | 395/121 |
| 4,866,612 | 9/1989 | Takagi | 364/413.22 |
| 4,907,152 | 5/1990 | Lempriere | 364/413.18 |
| 5,095,521 | 3/1992 | Trousset et al. | 395/121 |

OTHER PUBLICATIONS

IEEE Transactions on Medical Imaging, vol. MI-5, No. 1, Mar. 1986, IEEE (New York, U.S.), K. H. Hohne et al.: "Shading 3D-images from CT using gray-level gradients", pp. 45–47.

Proceedings of the IEEE, vol. 71, No. 3, Mar. 1983, IEEE (New York, U.S.), J. K. Udupa: "Display of 3D information in discrete 3D scenes produced by computerized tomography" pp. 420–431.

Primary Examiner—Roy N. Envall, Jr.
Assistant Examiner—A. Bodendorf
Attorney, Agent, or Firm—Nilles & Nilles

[57] ABSTRACT

The segmented object is represented in terms of a numerical volume by calculating the gradients of the physical quantities loaded into the volume elements of this numerical volume. The gradients are shown to be perpendicular to the true surface of the object to be segmented and that they determine a surface more precisely than a treatment carried out on the surface of the segmented object. To eliminate the artefacts of a contour line which are visible in particular in the regions of low relief, the gradients assigned to volume elements of the surface of the object are weighted with respect to gradients assigned to volume elements adjacent to these volume elements by apparent facets of this segmented object.

10 Claims, 5 Drawing Sheets

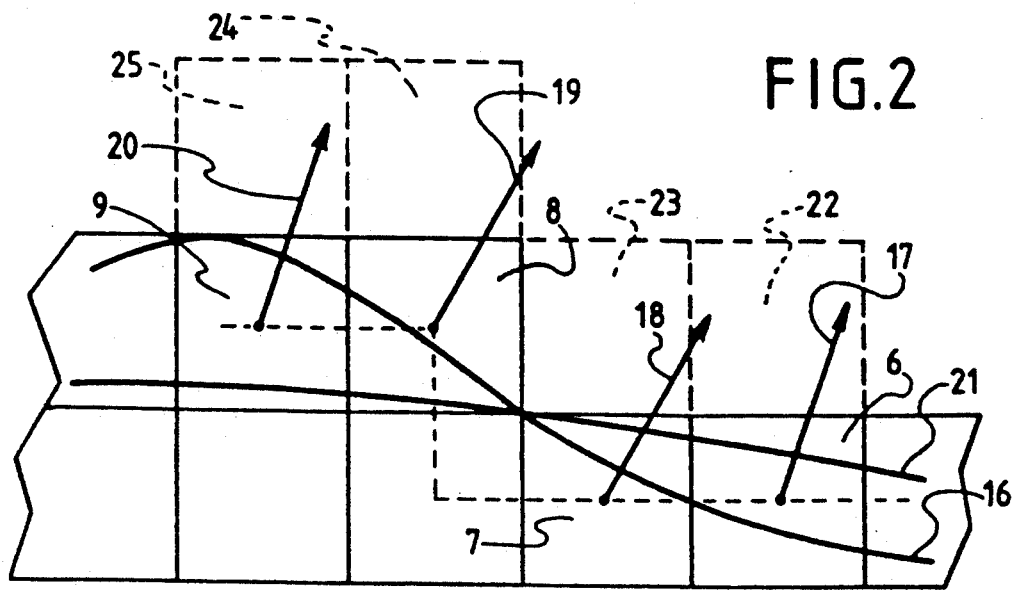
FIG.2
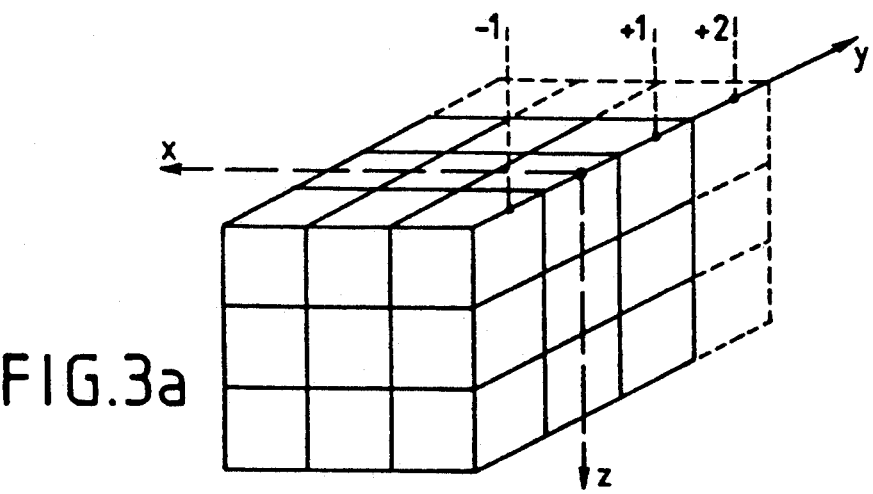
FIG.3a
| | y=-1 | |
|---|---|---|
| $-\frac{\sqrt{3}}{3}$ | $-\frac{\sqrt{2}}{2}$ | $-\frac{\sqrt{3}}{3}$ |
| $-\frac{\sqrt{2}}{2}$ | $-1$ | $-\frac{\sqrt{2}}{2}$ |
| $-\frac{\sqrt{3}}{3}$ | $-\frac{\sqrt{2}}{2}$ | $-\frac{\sqrt{3}}{3}$ |
FIG.3b
| | y=0 | |
|---|---|---|
| 0 | 0 | 0 |
| 0 | 0 | 0 |
| 0 | 0 | 0 |
FIG.3c
| | y=1 | |
|---|---|---|
| $\sqrt{3}/3$ | $\sqrt{2}/2$ | $\sqrt{3}/3$ |
| $\sqrt{2}/2$ | 1 | $\sqrt{2}/2$ |
| $\sqrt{3}/3$ | $\sqrt{2}/2$ | $\sqrt{3}/3$ |
FIG.3d

FIG.5a $y=-1$     $y=0$     $y=+1$     $y=+2$ $\left. \boxed{-\sqrt{}} + \boxed{0} + \boxed{+\sqrt{}} \right\} 27$ $\left. \boxed{-\sqrt{}} + \boxed{0} + \boxed{+\sqrt{}} \right\} 29$ $\left( \boxed{-\sqrt{}} + \boxed{-\sqrt{}} + \boxed{+\sqrt{}} + \boxed{+\sqrt{}} \right) \frac{1}{2}$

| $-\frac{\sqrt{3}}{3}$ | $-\frac{\sqrt{2}}{2}-\frac{\sqrt{3}}{3}$ | $-\frac{\sqrt{3}}{3}-\frac{\sqrt{2}}{2}$ | $-\frac{\sqrt{3}}{3}$ |
|---|---|---|---|
| $-\frac{\sqrt{2}}{2}$ | $-1-\frac{\sqrt{2}}{2}$ | $-\frac{\sqrt{2}}{2}-1$ | $-\frac{\sqrt{2}}{2}$ |
| $-\frac{\sqrt{3}}{3}$ | $-\frac{\sqrt{2}}{2}-\frac{\sqrt{3}}{3}$ | $-\frac{\sqrt{3}}{3}-\frac{\sqrt{2}}{2}$ | $-\frac{\sqrt{3}}{3}$ |

Z−, 29

27, X+

| $\frac{\sqrt{3}}{3}$ | $\frac{\sqrt{3}}{3}+\frac{\sqrt{2}}{2}$ | $\frac{\sqrt{3}}{3}+\frac{\sqrt{2}}{2}$ | $\frac{\sqrt{3}}{3}$ |
|---|---|---|---|
| $\frac{\sqrt{2}}{2}$ | $\frac{\sqrt{2}}{2}+1$ | $1+\frac{\sqrt{2}}{2}$ | $\frac{\sqrt{2}}{2}$ |
| $\frac{\sqrt{3}}{3}$ | $\frac{\sqrt{3}}{3}+\frac{\sqrt{2}}{2}$ | $\frac{\sqrt{3}}{3}+\frac{\sqrt{2}}{2}$ | $\frac{\sqrt{3}}{3}$ |

Z+, 29

PROCESS FOR REPRESENTING VIEWS OF AN OBJECT

BACKGROUND OF THE INVENTION

An object of the present invention is a process for representing views of an object. This object has to be discriminated in a digital volume. A digital volume results from the acquisition and storage of pieces of information concerning physical characteristics of internal parts of an examined body. The best known mode of acquisition of this information is the tomographic mode. This mode may be performed, especially in the medical field, by various means: nuclear magnetic resonance, tomodensitometry by X-rays, or tomography by gammagraphy or ultrasonic tomography. This acquisition mode may, of course, also be any mode, once it leads to a gathering of pieces of physical information that can be arranged virtually with respect to one another along three orthogonal axes of reference and are supposed to represent, in the virtual position that they occupy, the physical characteristics of corresponding parts in an examined body. Each volume element of this digital volume thus has at least two types of information. A first type concerns the coordinates of a corresponding place in the body (corresponding biuniquely to an address in a storage memory of a computer). The other type represents the value of the physical information which has been assigned to this place and which has been measured, for example by one of the above-mentioned techniques of tomography.

Techniques for the representation of views of objects to be discriminated in digital volumes are already known. There are chiefly two of them. A first technique, developed mainly by G. T. HERMAN and his team, comprises the sequence of the following operations. Taking a given digital volume, reformatted if necessary so that the resolution is identical in all three spatial dimensions, first of all a segmentation is done. The principle of the segmentation consists in comparing the values of the physical information loaded in each of the volume elements with a reference value and in selecting those of these volume elements for which the value of the physical information belongs, for example, to a value range located around this reference value. To simplify the matter, in tomodensitometry, it can be understood that a test on the density will enable differentiation, in the digital volume, of the volume elements corresponding to bones (high density) and the volume elements corresponding to soft tissue (low density). It is then possible to have a collection of addresses of memory cells that correspond to chosen volume elements and the set of which defines the object thus segmented.

The principle of the representation then consists in attributing a visible surface to each of the chosen volume elements (which, however, are located on the surface of the segmented object), computing an orientation of this surface (in estimating an orientation of the normal to it), and assessing the luminous contribution of this surface to an image of a view when this surface is exposed to a given illumination (namely, to an illumination coming, for example, from a precise point of the space external to the segmented object). The locations of the chosen volume elements, and hence of the corresponding visible surfaces being known, they can be attributed, in the image of the view to be represented, elements of the surface of this image for which the coordinates, in the image, depend on the point of view from which the segmented object is looked at. These surface elements are then assigned a luminosity representing the contributions of the visible surfaces to which they are assigned. The set of all the surface elements of the image constitutes the image of the view of the object.

This process has drawbacks; in particular, the shading is not satisfactory therein. For, the image obtained shows an effect of line artefacts or circle artefacts that seem to match the contours of the segmented object, in doing so irrespectively of the orientation of the illumination, and irrespectively of the viewpoint of observation of this object. These artefacts of contours are particularly discernible in the representation of surfaces with low relief. Although it is possible, at the extreme, to make do with them by mentally removing them during the examination of the view represented, it cannot be denied that these very same faults appear in the more uneven parts, with greater relief, of the views presented. For these parts, it then becomes impossible to distinguish the true representation from the artefact in the image.

This process further has another drawback which is related to the computation of the orientation of the visible surfaces. Briefly, the segmentation leads to assigning a piece of binary information, for example 1 and 0 respectively, to the volume elements chosen and to those that have been set aside. The orientation of the visible surface assigned to a chosen volume element is computed, in a standard way, by taking into account the distribution of the "ones" and "zeros", in the volume elements directly neighboring the chosen volume element. This leads, firstly, to a restricted number of possibilities of orientation of this surface (81 possible orientations if the 26 volume elements directly neighboring the chosen volume element are taken), above all if we take into account the fact that because of the observation viewpoint, this number of possibilities is divided by two. Secondly, this computation leads, in certain borderline cases, to showing a scintillation in the image. For, if the physical information tested for a set of adjacent volume elements is very close to the limit of the range of segmentation, some of these volume elements will be chosen, and others will not. The result thereof may be a crenelated outline of the segmented object at this position whereas its true shape may be smooth, but located, in terms of value of physical information, at a level that is a source of difficulty in view of the criterion chosen to do the segmentation. This crenelated profile causes the scintillation of the image.

Another process of representation, derived from techniques of image synthesis and computer-aided design, is aimed at achieving a segmentation in memory planes of the memory volume that corresponds to sections of the digital volume. For example, all the sections perpendicular to a given axis (an axis Z) are segmented. In all these sections, using correlation methods, it is possible to trace a "smoothened" contour of the section of the segmented object. Then, in a subsequent operation, the contours belonging to each of the adjacent sections are associated so as to determine facets of chosen dimensions which are generally triangular. A triangular facet is, for example, defined by three points, two of them belonging to a contour in one section, a third one belonging, in intermediate position, to a contour in an adjacent section. The position of each facet is known and, in the displayed image, a surface element of this image can be made to correspond to it. The luminous contributions for these facets are also computed, and the image of the view is then built. This technique suffers from the earlier drawbacks, albeit to a lesser degree. The artefacts of contours are all the same present when these contours are aligned along the axis to which the sections used are perpendicular. Furthermore, this other technique has a major drawback: it is unwieldy to implement by means of standard computers. It practically cannot be contemplated unless the number of the facets to be shown in the image is restricted to 5,000 to 10,000 facets. Now, for medical images, or more generally for images representing unknown objects that have to be recognized (and not symbolic objects that can be used in simulation), the number of facets to be represented is of the order of 500,000 to 1,000,000. The computation times relating to this technique are then no longer acceptable.

SUMMARY OF THE INVENTION

It is an object of the present invention to overcome these drawbacks by proposing a mode of representation wherein the surface of the segmented object, such as it might have been determined at the end of the segmentation process, is no longer taken into account. In the representation of the invention, on the contrary, what is taken into account is the normal to the surface of the real object, hence determined truly by the corresponding part of the body examined, to constitute the set of visible surfaces to be represented. Thus, when the segmentation criterion is restricted to discriminating volume elements that might belong or might not belong to the segmented object, an automatic effect of smoothening of the representation at this place is obtained in paying attention, for example, to the gradient of the value of the piece of physical information loaded in these volume elements, since this gradient does not undergo an all-or-nothing fluctuation from one element to another (except for those parts of the body that are highly differentiated: the bones with respect to soft tissues). In other words, the representation of the forms of the tissues with neighboring physical characteristics is improved. Furthermore, to improve the artefact related to the problems of change in level, we quite simply use the gradients of pieces of physical information of neighboring volume elements of the segmented volume elements on the surface of the segmented object.

In an IEEE document, Transactions on Medical Imaging Vol. MI-5, No. 1, March 1986, pages 45–46, the use of components of gradients is recommended. However, the use made thereof does not enable artefacts to be avoided.

Under these conditions, an object of the present invention is a process for representing views of an object to be discriminated in a digital volume, this digital volume comprising volume elements loaded with at least one piece of physical information, this process comprising the following steps:
the digital volume is segmented according to a criterion of segmentation enabling the volume elements to be chosen as a function of the value of the piece of physical information with which they are loaded, and so as to thus extract a segmented object from this digital volume;
to each volume element chosen and located on the surface of the segmented object, a visible surface is attributed;
the contribution of this surface to the view to be represented is assessed;
a luminous image is constructed with surface elements, the locations of which, in the image, represent the locations, in the segmented object, of the volume elements chosen and located on the surface of this segmented object, and the luminosity values of which represent the contributions of the visible surfaces attached to these chosen elements, and located on the surface,
characterized in that
an attribution is made, as a visible surface to each volume element chosen and located at the surface of the segmented object, of the set of the facets of this element in contact with the internal and external environment of this surface of the segmented object.

It can be shown that it is thus possible to attribute, as a visible surface to each volume element chosen, the set of the apparent facets of this volume element which, in other respects, do not belong to any other volume element of the segmented object. According to another characteristic of the invention, the contribution of the visible surfaces of the volume elements is assessed as a function of the gradient of the piece of physical information at the position of the corresponding volume elements. In one improvement, the contribution of the visible surfaces of a volume element is even assessed on the basis of gradients of physical information at the position of the corresponding volume elements as well as at the position of the volume elements located in the neighborhood of these corresponding volume elements.

BRIEF DESCRIPTION OF THE DRAWINGS

The invention will be better understood from the reading of the following description and from an examination of the accompanying figures. These are given purely by way of indication and in no way restrict the scope of the invention. In particular, they concern only the essential parts of the invention. The figures show:

FIG. 2: a comparison between the profile of the object and the profile of the real surface;

FIGS. 3a, 3b, 3c, and 3d: a preferred embodiment of gradient computation;

FIGS. 4 and 5a and 5b: the particular features of computation of the gradient in taking into account the apparent facets of the segmented object.

DETAILED DESCRIPTION OF THE PREFERRED EMBODIMENT

Figure 1A:
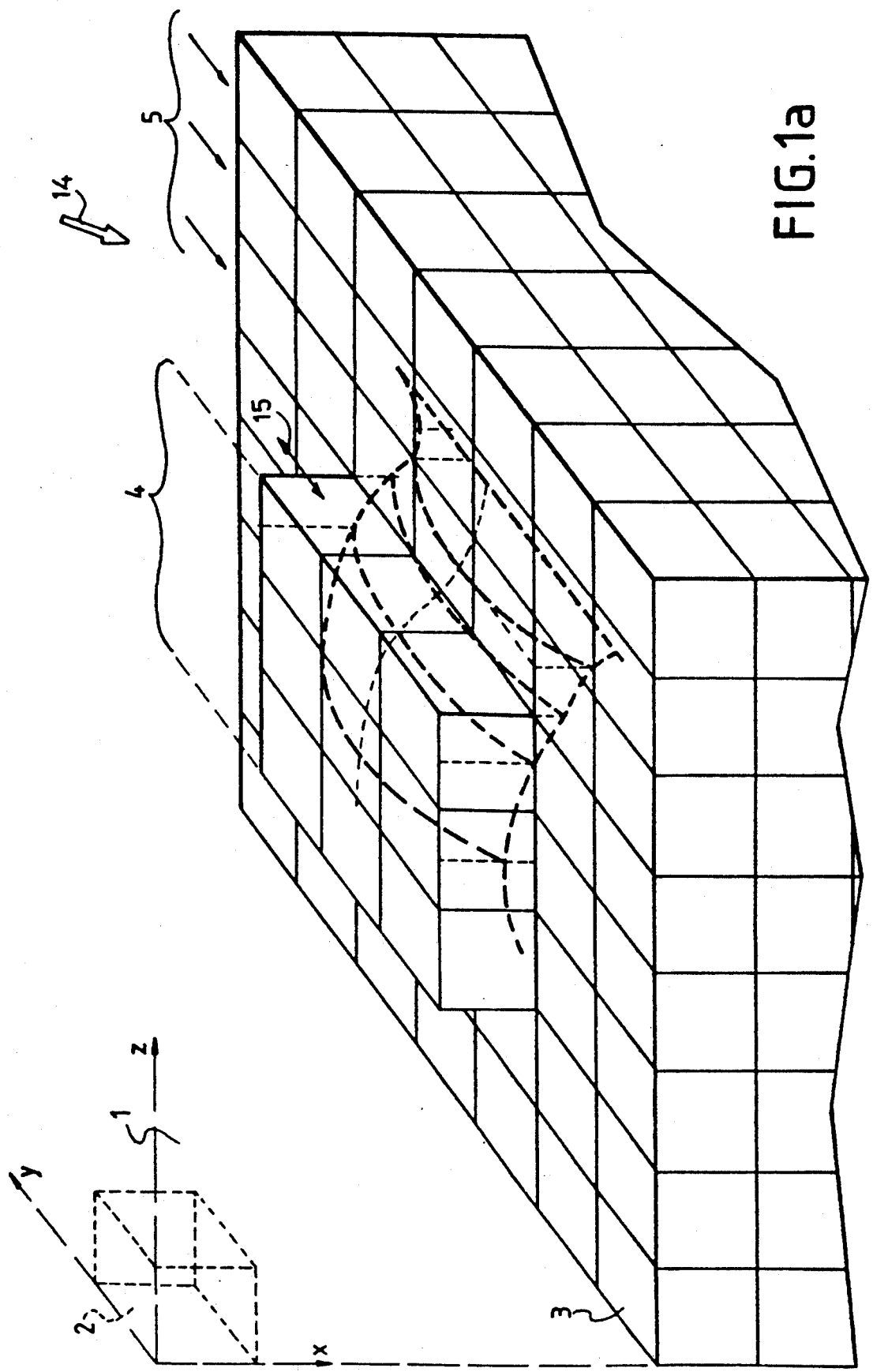
FIGS. 1a and 1b: a digital volume and the surface of a segmented object in this volume.
Figure 1B:
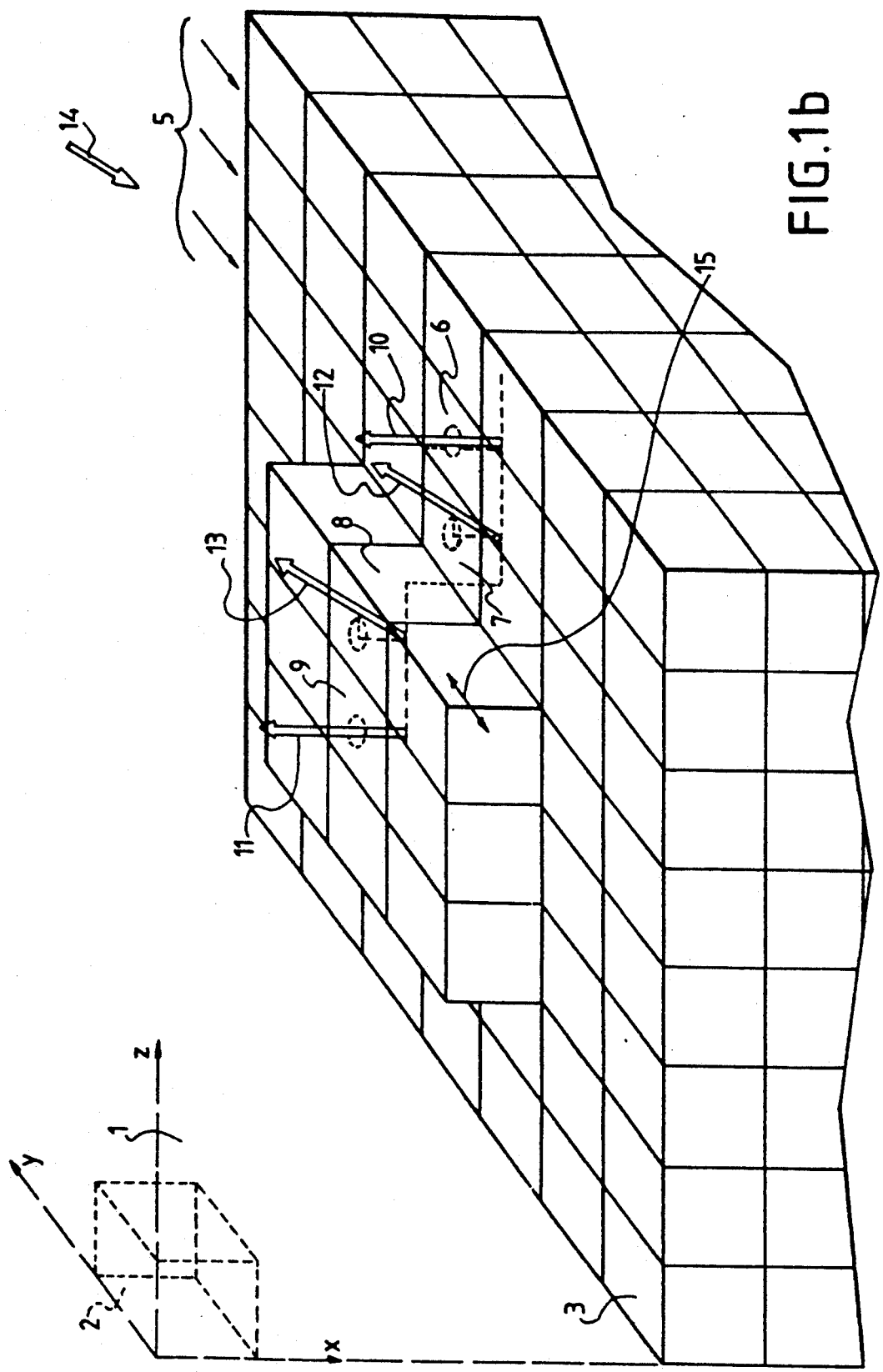

FIG. 1a shows a digital volume 1 recalled schematically by three orthogonal reference axes X, Y, Z. It symbolizes a part of the volume of an examined body (not shown) in which, the acquisition of pieces of physical information, that is, information about the physical characteristics of the body under examination, has been undertaken. After segmentation, according to known processes, the digital volume 1 has assumed a binary form. Volume elements such as 2, wherein the piece of physical information loaded does not meet the criterion of segmentation, have been assigned a given binary significance (0 in this case) while other volume elements, such as 3, have on the contrary been assigned a different binary significance (1 in this case) because they have been considered to represent part of the object to be discriminated in the body. FIG. 1a further shows, in thick dashes, a part of the true surface of a part of the examined body that has given rise to the segmentation. This surface has a protuberance 4 that emerges above a plane face 5. FIG. 1b shows, for the same elements, the manner in which the orientations of the representative surfaces, attributed to the chosen volume elements because of the segmentation, were computed. With these orientations, their contribution to the image is assessed. A more special study will be made of the case of the volume elements 6 to 9 which are located at the surface of the segmented volume. They are normally visible from a viewpoint located perpendicularly to the plane of the figure: namely, at the position of the eyes of an observer looking at this figure. The volume elements 6 and 9 are surrounded by volume elements having a symmetry with respect to them along the planes XZ or XY. Consequently, the computation of the normal to the visible surface of the volume elements 6 to 9 leads to the determination of the normal vectors, 10 and 11 respectively, which have components only along X. For the two volume elements 7 and 8, which belong to the segmented volume on either side of the change in level with respect to the plane 5, it can be shown that the standard computations, based on the shape of the segmented volume (i.e. as it appears herein with its set-back) leads to the determination of two slightly inclined normals, 12 and 13 respectively. It can be assumed, as a first approach, that the normals 12 and 13 are substantially parallel to each other.

From the volume element 6 to the volume element 7, with the normals approaching each other, we are before a visible surface with a concave shape. By contrast, from the volume element 8 to the volume element 9, with the normals 11 and 13 being divergent, we are before a convex surface. If these volume elements 7 to 9 are subjected (mathematically) to an illumination coming from a direction 14, for example with an orientation $(1, -1, -1)$, these respectively concave and convex surfaces will have a luminosity level different from each other. From this difference in luminosity, which winds all along the edge 15 of the set-back in the protuberance 4 with respect to the plane 5, a line-shaped artefact will result in the displayed image. Whereas, in the image which should have been shown, and which is partially shown in FIG. 1a, at this place, there is no break in the slope of the surface of the true object. Hence, at this place, a luminous edge, having something in common with a contour, should not have been shown.

So as to overcome this drawback, there is provision, in the invention, for no longer computing the normals to the surfaces of the volume elements chosen by the shape of these surfaces, but to replace them by the gradient of the piece of physical information, at the position of the chosen volume element, and on which the segmentation is done. In doing so, cf. FIG. 1a, the effects of disorientation of the surfaces to be displayed are subdued, and the reality of the true surface of the object that has been segmented. FIG. 2 shows a section of FIG. 1a taken, along a plane X Z, amidst the volume elements 6 to 9. The contour 16 of the surface of the object to be represented is indicated. The centers of the volume elements are also marked. The normal to the visible surface, attributed to each volume element of the surface of the segmented object, is identified with the direction of the gradient. With this gradient orientation, there is associated a perpendicular orientation of a given elementary surface. In other words, in FIG. 2, the unknown true surface (16) is now replaced by an estimation of a surface determined as being perpendicular to the gradient of the piece of physical information loaded in the volume elements considered. It is noted that the arrows 17 to 20, which represent the orientations of these gradients, have smaller deviations with respect to one another than in the case represented in FIG. 1b. In particular, the orientations of the gradients 17 and 20 take into account the slope of the surface 16 at the location of the volume element to which they belong.

FIGS. 3a to 3d give an example of the computation of the intrinsic gradient of the physical information contained in a volume element surrounded by 26 $(3 \times 9 = 27 - 1)$ neighboring volume elements. In a preferred example, these gradients are computed according to a method called the ZUCKER method. According to this method, each of the components of the gradients is computed by bringing into play the volume elements that are in the planes located on either side of this volume element, along an axis parallel to the component to be computed. For example, referring to FIGS. 3b to 3d, it is sought to compute the component along the axis Y and the volume elements located before the volume element considered (FIG. 3b : Y = -1) are brought into play, and the volume elements located in a plane behind the volume element considered (FIG. 3d : Y = +1) are also brought into play. The volume elements located, from this point of view, in the same plane as the volume elements considered (FIG. 3c: Y = 0) are not taken into consideration. Furthermore, each of the volume elements is taken into consideration in each case, in proportion to the converse of its distance from the volume element considered. To compute the components of the intrinsic gradients, the coefficients indicated in the FIGS. 3b to 3d are multiplied, each time, by the values of the pieces of physical information contained in the respective volume elements. Then, a summation is done, for each plane, of the weighted participations of each of the volume elements taken into account. Then, the value obtained for the front plane is subtracted from the value obtained for the rear plane. The distance, once standardized, determines the component of the intrinsic gradient. The same action is taken with the other two components, X and Z, of the gradient intrinsic so as to determine the orientation of this gradient intrinsic in three-dimensional space.

FIG. 2 makes it possible to realise that the true contour 16 weaves between the centers of the volume elements belonging to the surface of the segmented object. It must then be recalled that we are dealing with a piece of physical information. The piece of physical information on which the segmentation is done is not a piece of physical information that changes suddenly at the place of the change from one environment to another. For example, from a soft tissue, namely grey matter, to another soft tissue namely white matter (in the human brain), the transition is not a sudden one. If it is agreed to speak in terms of density, whether this density is measured by X-radiation or by nuclear magnetic resonance, we approach a definition of the surface of the segmented object as being a surface of isodensity. And, at the position where the gradients are measured, in the midst of the volume elements, we are rarely on the isodensity surface that corresponds to a reference density that it is sought to demonstrate. It is quite possible to show volume elements (6 to 9) in which this surface of isodensity passes, but it is not possible to make a computation, with certainty, of the true orientation of the normal to this surface. All that is made of it is an approximation related to the position of the true surface and the position where it is estimated that it is located (at the center of the volume element).

In a particularly obvious way, on another profile 21, replacing for example the profile 16 in FIG. 2, it can be shown that the geometrical difference between two surfaces of isodensity taken into account, instead of only one surface, may be equal to the height of an entire volume element. This is observed by the locations of the centers of the volume elements 7 and 8, which are very far removed from the trace 21 of the true surface. Were the isodensity curves to be all parallel to one another, the phenomenon would be hardly visible. But this is not so. The choice in one case (volume element 6 or 7) of one isodensity curve and the choice in another case (volume element 8 or 9) of another isodensity curve may lead to presenting, at the position of the break, at the position between the volume elements 7 and 8, of a sudden change in the orientation of the visible surface attributed to each of the volume elements considered. The above-mentioned phenomenon does not occur to such an accentuated degree, but it appears all the same. A contour artefact could still be seen.

To overcome this drawback, the idea emerged of computing a mean between the intrinsic gradients of the volume elements located close to the surface of the segmented volume. For example, attention is now paid also to the volume elements, 22 to 25 respectively, which do not belong to the segmented object but are located above the volume elements 6 to 9. The three components of the gradient intrinsic of their physical information are also computed for these volume elements. Then a weighting is done between the gradients of the volume elements that belong to the segmented object and the gradients of those neighboring volume elements which, for example, do not belong to it, to determine the components of the normal to the visible surface attributed to a volume element of the surface of the object.

This procedure has several consequences. The first consequence is to smoothen the variations in the orientations of the intrinsic gradients. Ultimately, the disturbing effect of the computation of the gradients intrinsic for volume elements located on different isodensity curves is neutralized. This is the aim sought. Then, if it is intuitively understood that it is possible to use the set of volume elements that are external but in direct contact with the segmented object, it is also understood that the weighting could have been done by using volume elements that are internal to the segmented volume and are themselves also in direct contact with the volume elements forming the surface of this segmented volume. Both approaches are possible.

Figure 4:
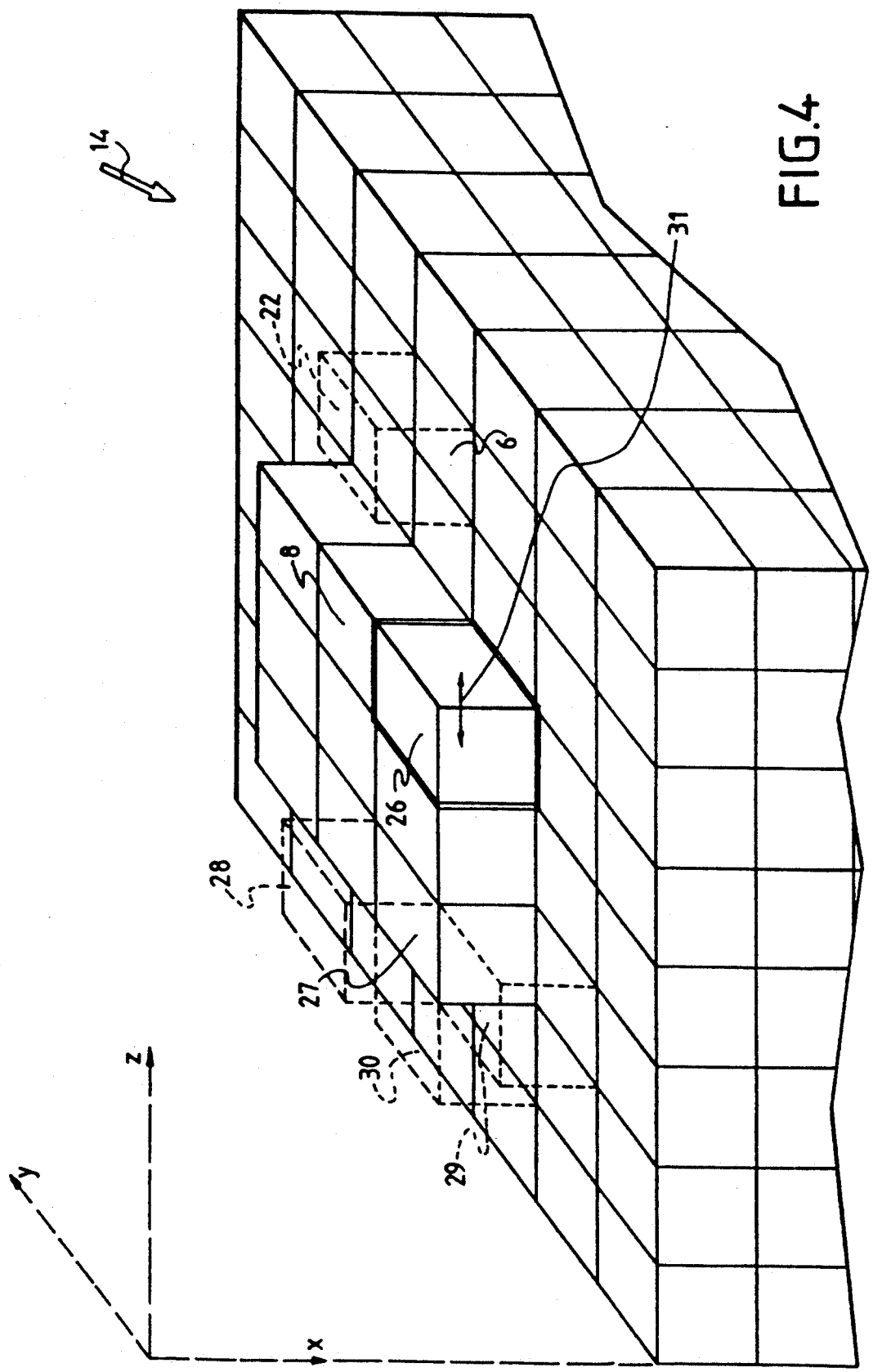

Either of these approaches can be chosen but, in practice, and in the following description, we take into account a weighting of the intrinsic gradients of the volume elements of the surface of the segmented object by the intrinsic gradients of the volume elements that are external to this object and are directly in contact with them. FIG. 4 shows, under conditions identical to those described for FIGS. 1a and 1b, what is seen by an observer located in the position of the one looking at this figure. It is thus indicated that the intrinsic gradient of the volume element 6 should be weighted by the gradient of a volume element 22 that is superimposed on it. As regards the volume element 8, the problem is somewhat more complicated since this volume element has two facets belonging to the surface of the segmented object. It has a facet oriented towards the top of the figure and a facet oriented towards the right-hand side of this figure. In an even more general case, a volume element such as 26 could have three facets in contact with volume elements that do not belong to the volume of the segmented object. In theory, there may even be up to five of them. This is also the case of a volume element 27, located to the left of the protuberance 4. This element 27 possesses, however, the particular feature wherein, for three facets in contact with the external environment, only two are visible to the observer.

In the invention, the existence of these facets is turned to advantage. Firstly, each of the external facets of the volume elements of the surface shall be given a representative elementary image surface in the image to be reconstructed. It is possible, in particular, to take into account a point of observation (the eye of the present observer of the figure) to assign, in an image to be constructed, three image surface adjacent elements to the volume element 26 since three of its facets are seen. The apparent shape of the three facets of the element 26 is emphasized by a double line. It is also possible to assign two image surface elements to the volume element 27, since only two of its facets are seen. Finally, it is possible to assign only one image surface element to the volume element 6 since only one of its facets is seen. This type of computation is known and is, for example, published in "Visualisation rapide de surfaces d'objets échantillonés" (Fast Display of Surfaces of Sampled Objects) in the report of the conferences of the second "Colloque Image" (Colloquium on Images), Nice, April 1986. The originality of the invention lies in the fact that these apparent facets are taken into account to attribute, in the represented image, visible surfaces to each of them and that the orientation of these visible surfaces is considered to depend, on the contrary, on the value of the intrinsic gradients of the volume elements that are precisely adjacent to one another by these facets.

Thus, for the facet located above the volume element 27, a computation is done of the intrinsic gradient of the physical information in this element 27 as well as in an element 28 which is located above the element 27 and is adjacent to it by this upper facet. For the front facet of the volume element 27, a volume element 29 which is adjacent to it precisely by this front facet, is brought into play. Although this is not necessary, because the rear facet cannot be seen in the view presented with the orientation of FIG. 5, it is nonetheless possible to compute the orientation of a visible surface attributed to the left-hand lateral facet of the volume element 27, in assessing the intrinsic gradient of the physical information of a volume element 30 located to the left of the volume element 27.

In short, in the process of the invention, the following operations are performed. A segmentation is done. The intrinsic gradients of the volume elements belonging to the surface of the segmented object are computed. A computation is also done of the intrinsic gradients of the volume elements, for example those that do not belong to the segmented object but are adjacent to the volume elements forming the surface of this segmented objected by at least one external (or internal) facet of these volume elements. And, finally, the intrinsic gradients of two adjacent volume elements taken into consideration are weighted, in attributing the weighted value to the facet of adjacency. The representation operations are then standard ones. A direction of illumination 14 is determined. An assessment is made of the luminosity emitted by a facet which would have a determined orientation, this orientation being defined by the weighted gradient. And the image of the view is constructed. In this image, the surface elements of the image are located, with respect to the observer, at the position of the facets of the volume elements that can be seen by the observer.

In practice, the intrinsic gradient can be computed more simply. Taking the segmented object, it is possible, from the outset, using a standard processing method, to know the facets that are normally oriented towards the non-segmented, external space of the segmented object. Under these conditions, the computation of the gradient can be modified directly so that the weighted gradient is computed only once. Returning to FIG. 3a, and transposing its teaching to FIG. 5a, it may be considered that the first line of this FIG. 5a schematically represents the ponderations to be assigned to the volume elements neighboring the volume element 27 to compute the component, along Y, of its intrinsic gradient. The second line corresponds to a same computation, done on the contrary for the volume element 29 which is adjacent to it by its upper visible facet. In a simple weighting, where each intrinsic gradient counts for half, it may be considered that the intrinsic gradient of the facet is equal to the half sum of these two gradients. In the squares, the root sign represents the weightings, assigned to the values of the pieces of physical information, and represented respectively in FIGS. 3b to 3d. The third line of FIG. 5A gives a schematic view of the half sum of the gradients intrinsic to be assigned to the facet: all the volume elements have to undergo one and the same type of combination. It is then possible to provide, in the processing computer, for a specialized operator performing the computation. Time is saved thereby. FIG. 5b shows the computation of components along X (or along Y) as a function of the volume elements 27 and 29 considered. The symbols + and − determine, in the direction of the computed component, the interventions of the different planes of volume elements: behind or before the concerned volume element. For these computations too, another specialized operator may be programmed in the computer.

With regard to the representation proper, the following description shall be restricted to an effect of light scattering sent back by the visible facets of the volume elements forming, according to the invention, the visible surfaces of these volume elements. It is recalled that a facet scatters light in all directions equally, but that the intensity of this scattering varies as a function of the orientation of this facet with respect to the direction from which the illumination (14) comes. This simplification means that the viewpoint of observation of the segmented object does not have to be taken into account for computing the luminosity of the facet. Assuming that this scattering function is proportionate to the cosine of the angle of incidence of the direction of illumination with the perpendicular to the facets, the luminosity of this facet is quickly approached by computing the scalar product of a unit vector, representing the direction of illumination, with the intrinsic gradient attached to this facet. The computing of scalar products in a computer is very well known.

Attention might also be paid to an effect of reflection of light, in which the orientation of the facet, the orientation of the illumination, but also the position of the observation viewpoint come into play. An eye located at this viewpoint receives all the more of reflected light coming from a facet as the normal to this facet approaches a direction neighboring the bisector of the angle formed by the direction of observation and the direction of illumination. An effect of proximity of the observer to the segmented object can also be taken into account. For there are known ways to propose views as if they were observed at a distance equal to 1000 or 1500 times the elementary dimension of a volume element. In this case, to the luminosity computed for each facet or, in what amounts to the same thing, for each elementary surface of the image to be constructed, there is applied a refined weighting coefficient, that is, a coefficient depending on the distance from the observer to each of the volume elements represented.

It may happen that the scalar product of the normal by the direction of illumination is negative. This means that the facet could not be illuminated by the illumination, whereas this facet is visible to the observer. This is the case, for example (FIG. 4), of the edge 31 which can be seen from the observer whereas it is not illuminated by the illumination 14. Under these conditions, the illumination can be slightly modified so that it no longer comes only along a direction 14 but in adding to it, for example, a component of ambient light. The result thereof is that the luminosity assigned to each surface element for each facet may be of the type:

$$(1+N.L)p/2$$

where N represents the gradient (whether weighted or not), where L represents the direction of illumination and where p represents a coefficient of smoothening the sharpness of contrast effects obtained with an excessively simplified scattering relationship such as this. The precision obtained in the computation of the normal to the surface, however, makes it possible to use, in addition to the scattering effect, a reflection effect and thus, by the choice of weighting parameters, to modify the appearance of the material displayed.

What is claimed is:

1. A process for representing views of an object to be discriminated in a digital volume, said digital volume comprising volume elements each loaded with at least one piece of physical information concerning physical characteristics of said object, said process comprising the following steps:

a. segmenting the digital volume according to a criterion of segmentation enabling said volume elements to be chosen as a function of said at least one piece of physical information with which they are loaded, and so as to thus extract a segmented object from said digital volume; then b. attributing a visible surface to each volume element chosen and located on the surface of the segmented object; then c. assessing contribution values attached to said visible surface of each chosen volume element; and then d. constructing a luminous image with surface elements, locations of which, in the luminous image, represent locations, in the segmented object, of the volume elements chosen and located at the surface of the segmented object said surface elements having luminosity values which represent said contribution values attached to said visible surfaces of said elements chosen and located on said surface of the segmented object; wherein said visible surface of each volume element chosen and located at the said surface of the segmented object comprises facets in contact with an internal and external environment of said surface of the segmented object; and wherein said step of assessing includes a step of assessing contribution values for each of the facets as a function of an intrinsic gradient of said at least one piece of physical information, at the location of the corresponding volume elements, said intrinsic gradient being a gradient independent of a direction of illumination of the facets.

2. A process according to claim 1, wherein said step of attributing a visible surface to each volume element includes a step of attributing apparent facets to each said volume element which, in other respects, do not belong to another volume element of the segmented object, said apparent facets being visible from a given point of view for viewing said segmented object.

3. A process according to claim 1, wherein said step of assessing includes a step of assessing contribution values associated with said visible surface as a function of an intrinsic gradient of said at least one piece of physical information of a volume element in a neighborhood of the corresponding volume element.

4. A process according to claim 2, wherein said step of assessing includes a step of assessing said contribution values for each of said apparent facets as a function of a measurement of orientation of said apparent facets by computing a normal to said apparent facets on the basis of the values of the gradients of the pieces of physical information that are loaded in the volume elements located on either side of said apparent facets.

5. A process according to claim 4, wherein said step of measuring the orientation of the apparent facets includes a step of computing a normal to said apparent facets as a function of values of pieces of physical information loaded in volume elements located on either side of said apparent facets.

6. A process according to any one of claims 2 to 5, further including a step of computing, for each of said apparent facets, the location and the luminosity of a surface element in the luminous image corresponding to the contribution of the facet.

7. A process for representing a view of an object to be discriminated in a digital volume, said digital volume comprising volume elements each loaded with at least one piece of physical information concerning physical characteristics of said object, said process comprising the following steps:

(a) segmenting the digital volume according to a criterion of segmentation enabling said volume elements to be chosen as a function of a value of said at least one piece of physical information to thereby extract segmented object from said digital volume, said segmented object having an internal environment included within said segmented object, a plurality of volume elements chosen and located on a surface of the segmented object, and an external environment not included within said segmented object; then (b) attributing a visible surface to each volume element chosen and located on the surface of the segmented object, said visible surface of each volume element comprising at least one facet in contact with said external environment; then (c) assessing a contribution value of said at least one facet toward the construction of a luminous image, said contribution value being assessed as a function of an intrinsic gradient of said at least one piece of physical information of the volume element including said at least one facet, said intrinsic gradient being a gradient independent of a direction of illumination of said at least one facet; and then (d) constructing a luminous image with surface elements, locations of which, in the luminous image, represent locations, int he segmented object, of facets of the volume elements chosen and located on the surface of the segmented object, said surface elements having luminosity values which represent said contribution values of said facets.

8. A process according to claim 7, wherein said at least one facet comprises apparent facets, said apparent facets each being in contact with said external environment and each being visible from a given point of view for viewing said segmented object.

9. A process according to claim 7, wherein said step of assessing includes a substep of assessing the contribution value as a function of an intrinsic gradient of said at least one piece of physical information of a volume element adjacent to the volume element including at least one facet.

10. A process according to claim 8, wherein said step of assessing includes the substeps of measuring an orientation of said apparent facets by computing a normal to said apparent facets on the basis of the values of the gradients of the pieces of physical information that are loaded in the volume elements located on either side of said apparent facets and assessing said contribution values for each of said apparent facets as a function of the orientation measurement.

* * * * *